United States Patent [19]

Park

[11] Patent Number: 4,640,933

[45] Date of Patent: Feb. 3, 1987

[54] EXPANDABLE POLYOLEFIN COMPOSITIONS AND PREPARATION PROCESS UTILIZING ISOBUTANE BLOWING AGENT

[75] Inventor: Chung P. Park, Pickerington, Ohio

[73] Assignee: The Dow Chemical Company, Midland, Mich.

[21] Appl. No.: 868,395

[22] Filed: May 27, 1986

Related U.S. Application Data

[62] Division of Ser. No. 843,422, Mar. 24, 1986, which is a division of Ser. No. 813,315, Dec. 24, 1985.

[51] Int. Cl.$^4$ .................................................. C08J 9/14
[52] U.S. Cl. ........................................ 521/94; 264/53; 264/DIG. 5; 521/79; 521/81; 521/97; 521/134; 521/139; 521/98; 521/910
[58] Field of Search ................. 521/79, 81, 94, 98, 521/97, 134, 139, 910

[56] References Cited

U.S. PATENT DOCUMENTS

| | | | |
|---|---|---|---|
| 4,214,054 | 7/1980 | Watanabe et al. | 521/79 |
| 4,258,300 | 3/1981 | Park | 521/79 |
| 4,331,777 | 5/1982 | Hoki et al. | 521/79 |
| 4,331,779 | 5/1982 | Park | 521/81 |
| 4,343,911 | 8/1982 | Hoki et al. | 521/79 |
| 4,343,913 | 8/1982 | Watanabe et al. | 521/79 |
| 4,345,041 | 8/1982 | Hoki et al. | 521/79 |
| 4,347,329 | 8/1982 | Park | 521/79 |
| 4,359,539 | 11/1982 | Hoki et al. | 521/79 |
| 4,368,276 | 1/1983 | Park | 521/79 |
| 4,369,257 | 1/1983 | Hoki et al. | 521/79 |
| 4,395,510 | 7/1983 | Park | 521/94 |
| 4,483,809 | 11/1984 | Ando et al. | 264/53 |
| 4,515,907 | 5/1985 | McCullough et al. | 521/139 |
| 4,521,541 | 6/1985 | Rutherford et al. | 521/79 |
| 4,528,300 | 7/1985 | Park | 521/79 |

Primary Examiner—Morton Foelak

[57] ABSTRACT

An expandable polyolefin composition and a method of preparation are provided. Isobutane or mixtures of isobutane with other physical blowing agents are utilized to expand polyolefin compositions which have been modified by the addition of a stability control agent. The composition has a high degree of dimensional stability and exhibits minimal shrinkage during curing and/or aging.

4 Claims, No Drawings

EXPANDABLE POLYOLEFIN COMPOSITIONS AND PREPARATION PROCESS UTILIZING ISOBUTANE BLOWING AGENT

This is a division of application Ser. No. 843,422 filed on Mar. 24, 1986, which is a division of application Ser. No. 813,315, filed Dec. 24, 1985.

BACKGROUND OF THE INVENTION

This invention relates to expandable olefin polymer compositions and processes, and more particularly to expandable modified olefin polymer compositions having dimensional stability utilizing low cost isobutane as a primary blowing agent.

It is well known to prepare olefin polymer foams by heat plastifying a normally solid olefin polymer resin, admixing such heat plastified resin with a volatile blowing agent under heat and pressure to form a flowable gel and thereafter extruding the gel into a zone of lower pressure and temperature to activate the blowing agent and expand and cool the gel to form the desired solid olefin foam product.

A problem frequently encountered is that of preventing an unacceptable degree of shrinkage of partially cured foam during the aging or curing period following manufacture. During the aging or curing period the blowing agent employed gradually diffuses out of the cells in the foam product and air gradually diffuses into the cells in place thereof. Until quite recently, it was believed that only one volatile hydrocarbon blowing agent, namely 1,2-dichlorotetrafluoroethane, was capable of providing sufficient dimensional stability during the curing period to permit the commercially viable manufacture of low density (e.g., 1 to 6 pounds per cubic foot (16 to 96 kg/m$^3$) foams of ethylenic polymer resins. That is, only dichlorotetrafluoroethane was believed to diffuse out of the foam cells slowly enough to prevent cell wall collapse while air was slowly diffusing into the cells.

More recently, permeability modifiers or stability control agents have been developed for incorporation into the polyolefin in an attempt to slow the diffusion of volatile hydrocarbon blowing agents out of polyolefin foam cells. The objective of these permeability modifiers is to render the foams more dimensionally stable to a wider variety of volatile hydrocarbon blowing agents. For purposes of this invention, the terms "permeability modifier" and "stability control agent" will be used interchangeably and will refer to compositions incorporated into the polyolefin to slow diffusion of volatile hydrocarbon blowing agents from the foam cell walls. For example, Watanabe et al, U.S. Pat. No. 4,214,054, teaches the production of polyolefin foams utilizing volatile hydrocarbon blowing agents. Permeability modifiers such as saturated higher fatty acid amides, saturated higher aliphatic amines, and esters of saturated higher fatty acids are incorporated into the polyolefin composition prior to expansion.

Park U.S. Pat. No. 4,331,779, also teaches ethylenic polymer foams having improved dimensional stability and teaches the use of a copolymer of ethylene and an unsaturated carboxylic acid as a stability control agent. Park, U.S. Pat. No. 4,347,329, teaches the use of a fatty acid amide such as stearamide for use in polyolefin foams as a stability control agent. Park, U.S. Pat. No. 4,395,510, further teaches the use of fatty acid amide stability modifier agents to produce polyolefin foams having improved elevated temperature dimensional stability.

The use of such permeability modifiers permits the use of a wider variety of volatile hydrocarbon blowing agents. However, in many cases, the more inexpensive volatile hydrocarbon blowing agents such as butane can only be utilized in small amounts in conjunction with other more expensive chloro- or fluorocarbons. In instances where butane has been used alone as the blowing agent in modified polyoefin foams, the foams exhibited maximum shrinkages defined as (1—the ratio of the volume of the foam on the day it is at a minimum to the volume of the foam immediately after expansion)×100of between 10 and 20%. See, for example, examples 21, 24, and 27 at Table 7 of Watanabe et al, U.S. Pat. No. 4,214,054.

Accordingly, the need still exists in the art for low cost volatile hydrocarbon blowing agents which can be used to expand olefin polymers and yet exhibit a high degree of dimensional stability with minimal shrinkage during aging or curing of the polymer foams.

SUMMARY OF THE INVENTION

The present invention meets that need by providing an expandable modified olefin polymer composition and process having a high degree of dimensional stability and minimal shrinkage utilizing inexpensive isobutane as a primary blowing agent.

According to one aspect of the present invention, an expandable polymeric composition is provided comprising an olefin polymer resin selected from the group consisting of ethylene homopolymers and copolymers of ethylene and a copolymerizable monomer, a stability control agent selected from the group consisting of partial esters of long chain fatty acids with polyols, higher alkyl amines, fatty acid amides, olefinically unsaturated carboxylic acid copolymers, and polystyrene, and a blowing agent selected form the group consisting of (i) isobutane, (ii) a mixture of from 5%–95% isobutane on a molar basis with from 95%–5% of a physical blowing agent selected from the group consisting of chlorofluorocarbons and fluorocarbons having from 1 to 4 carbon atoms, boiling points between $-50°$ and $50°$ C., and a permeation rate through said olefin polymer resin modified with said stability control agent of less than about 1.2 times the permeation rate of air, and (iii) a mixture of at least 70% isobutane with a physical blowing agent selected from the group consisting of hydrocarbons, chlorocarbons, and chlorofluorocarbons having from 1 to 5 carbon atoms, boiling points between $-50°$ C. and $50°$ C., and a permeation rate through said olefin polymer resin modified with said stability control agent of greater than about 1.2 times the permeation rate of air.

The modified polyolefin composition is expanded to a substantially closed-cell polymeric foam by heat plastifying the polymer resin, admixing with the resin the stability control agent and blowing agent described above, and then activating the blowing agent by exposing the admixture to a zone of lower pressure (i.e., atmospheric pressure) to expand the admixture to a substantially closed-cell olefin polymer foam.

It has been determined that there is a dramatic difference in the permeation rates between n-butane and its isomer isobutane through polyolefin films modified with a stability control agent. While n-butane has a relative-to-air permeation rate in excess of 1.0, the relative-to-air permeation rate of isobutane is only a fraction of 1.0. Thus, it has been discovered that inexpensive isobutane blowing agent may be used alone, or in combination with other volatile hydrocarbon blowing agents to produce a dimensionally stable foam having a low degree of shrinkage during curing. The invention has the additional advantage that the chloro- and fluorocarbon blowing agents heretofore utilized can be eliminated or used in much lesser amounts. The effects of such volatile halogenated hydrocarbons on the ozone layer of the atmosphere is still in question and it may be desirable to minimize their use.

Accordingly, it is an object of the present invention to provide an expandable modified olefin polymer composition and process, said polymer having a high degree of dimensional stability and minimal shrinkage during curing. This, and other objects and advantages of the invention will become apparent from the following detailed description and the appended claims.

DESCRIPTION OF THE PREFERRED EMBODIMENTS

Olefin polymer resins suitable for use in the practice of the present invention include ethylene homopolymers such as low, medium, or high density polyethylene, and ethylene copolymers such as ethylene-vinyl acetate copolymers, ethylene-propylene copolymers, ethylene-1-butene copolymers, ethylene-butadiene copolymers, ethylene-vinyl chloride copolymers, ethylene-methyl methacrylate copolymers, ethylene-acrylonitrile copolymers, ethylene-acrylic acid copolymers, and the like. As the olefin polymer resin, it is preferable to use an ethylene homopolymer or a copolymer having an ethylene content above 50 percent by weight, preferably above 75 percent by weight. Additionally, blends to two or more of such olefin polymer resins can also be suitably employed in the practice of the present invention. Preferred compositions include low density polyethylene and copolymers of ethylene with vinyl acetate.

Stability control agents suitable for use in the present invention include the partial esters of long-chain fatty acids with polyols described in U.S. Pat. No. 3,644,230, as well as higher alkyl amines, fatty acid amides and complete esters of higher fatty acids such as those described in Watanabe et al, U.S. Pat. No. 4,214,054. Typically, such stability control agents are employed in an amount ranging from about 0.1 to about 10 parts per hundred based on the weight of the olefin polymer employed.

In addition to, or in place of, the foregoing stability control agents, there may also be employed for such purpose copolymers of α-olefins with various monoethylenically unsaturated carboxylic acids such as those described in Park, U.S. Pat. No. 4,347,329 or copolymers of α-olefins neutralized carboxyl-group bearing moieties which are commonly referred to in the art as ionomers. Typically, such olefinically unsaturated carboxylic acid copolymers may be employed in an amount ranging from about 5 to about 95% by weight of the olefin polymer employed.

Finally, polystyrene may be utilized as a stability control agent in the present invention. Specific polystyrenes which can be utilized are described in Japanese Kokai No. 55-181384. Typically, such polystyrenes may be employed in an amount ranging from about 5 to about 50% by weight of the olefin polymer employed.

As has been explained, an important feature of the present invention is the use of low cost isobutane as the primary blowing agent in the modified olefin polymer foams. Isobutane may be used alone as the sole blowing agent. Alternatively, the isobutane blowing agent may comprise a mixture with one or more conventional physical blowing agents. The conventional blowing agents may be grouped into two subgroups: Groups I and II.

Thus, the blowing agent may comprise a mixture of from 5 to 95% isobutane on a molar basis with from 95 to 5% of a physical blowing agent selected from Group I consisting of chlorofluorocarbons and fluorocarbons having from 1 to 4 carbon atoms, normal boiling points between −50° C. and 50° C., and a permeation rate through the modified (with stability control agent) olefin polymer of less than about 1.2 times the permeation rate of air through the modified olefin polymer. This permeation rate is measured using the ASTM D-1434 method with the test gas at a pressure of one atmosphere, or the equilibrium vapor pressure of the gas at 23° C. if its boiling point is greater than 23° C. Examples of these Group I physical blowing agents are dichlorodifluoromethane (FC-12), 1,2-dichlorotetrafluoroethane (FC-114), and 1-chloro-1,1-difluoroethane (FC-142b).

If a Group II blowing agent is selected, the blowing agent may comprise a mixture of at least 70% isobutane with a physical blowing agent from Group II selected from the group consisting of hydrocarbons, chlorocarbons, and chlorofluorocarbons having from 1 to 5 carbon atoms, normal boiling points between −50° C. and 50° C., and a permation rate through the modified (with stability control agent) olefin polymer of greater than about 1.2 times the permeation rate of air through the modified olefin polymer. This permeation rate is also measured using the ASTM D-1434 method with the test gas at a pressure of one atmosphere, or the equilibrium vapor pressure of the gas at 23° C. if its boiling point is greater than 23° C. Examples of these Group II physical blowing agents are n-butane, isopentane, ethyl chloride, methylene chloride, trichloromonofluoromethane (FC-11), and 1,1,2-trichlorotrifluoroethane (FC-113).

In the practice of this invention, the blowing agent is compounded into the starting ethylenic polymer resin blend in proportions to make the desired degree of expansion in the resulting foamed cellular product, usually up to about 60-fold volume expansion to make products having aged foam densities down to about 9.6 kg/m$^3$ (about 0.6 pound per cubic foot). Depending on the starting proportion of blowing agent, the resulting foam products of this invention have relatively low foam densities, for example, having a density of from about 9.6 to about 240 kg/m$^3$ (0.6 to about 15 pounds per cubic foot (pcf)). The useful proportions of such blowing agent in compositions of flowable, foamable gel is on the order of from about 0.013 to about 0.50 gram-mole per 100 grams of the starting resin. The maximum useful proportion of blowing agent in the foamable gel is also affected by the pressure which is maintained on the gel in the extrusion die passage, being greater when the die pressure is relatively higher under conditions such as when the die orifice is relatively smaller and/or the through-put rate is relatively greater.

The blowing agent is compounded into the starting resin blend in conventional fashion to make a flowable gel, preferably in continuous manner, e.g., in a mixing extruder, using heat to plastify the resin blend, pressure to maintain the blowing agent in non-gaseous state, and mechanical working to obtain a thorough mixing of the resin blend and blowing agent. The resulting gel is then cooled if necessary and passed through a suitable die orifice into a zone of lower pressure, e.g., normal ambient air temperature, where it expands to a lower density, cellular mass. As the foamed extrusion forms, it is taken away from the extruder, allowed to cool to harden the resin blend, and collected for further processing, storage and subsequent use.

In addition to the hereinbefore described ingredients, there may also be employed in the practice of the present invention other ingredients or additives which conventionally find applicability in known extrusion foaming processes such as, for example, known nucleating (or cell-size controlling) agents (e.g., talc, clay, mica, silica, titanium oxide, zinc oxide, calcium silicate, metallic salts of fatty acids such as barium stearate, zinc stearate, aluminum stearate, etc.), wetting agents, and the like.

The following examples, in which all parts and percentages are on a weight basis unless otherwise indicated, are presented as illustrative of the present invention and are not to be understood as limiting its scope.

EXAMPLE 1

The relative permeation rates of various physical blowing agents through polyethylene film and polyethylene film modified with 2 pph of Kemamide (trademark) S-180 stearyl stearamide stability control agent were measured. Kemamide S-180 is commercially available from Humko Chemical Division of Witco Chemical Corp. The results are shown in Table I. Permeability data were determined using a modified ASTM D-1434 test method. As shown by Table I, in modified polyethylene, the relative-to-air permeation rate of isobutane is 0.31 while that of n-butane is 1.58. In order to produce a dimensionally stable polyolefin foam, the permeability of the polymer to blowing agent must be approximately equal to or lower than that to air. Otherwise, rapid diffusion of blowing agent from the foam cells during curing or aging will result in shrinkage and loss of dimensional stability.

EXAMPLE 2

The apparatus used in this example is a 1½ inch (3.8 cm) screw type extruder having two additional zones for mixing and cooling at the end of usual sequential zones for feeding, melting, and metering. An opening for blowing agent injection is provided between metering and mixing zones. At the end of the cooling zone, there is attached a die orifice having an opening of rectangular shape. The height of the opening is adjustable while its width is fixed at 0.25 inches (0.635 cm).

TABLE I

| Gas Type | Polyethylene Film (1) | | Polyethylene Film Containing 2 PPH Kemamide S-180 (2) | |
|---|---|---|---|---|
| | P (3) | P/Pair (4) | P (3) | P/Pair (4) |
| air | 233 | 1.0 | 133 | 1.0 |

TABLE I-continued

| Gas Type | Polyethylene Film (1) | | Polyethylene Film Containing 2 PPH Kemamide S-180 (2) | |
|---|---|---|---|---|
| | P (3) | P/Pair (4) | P (3) | P/Pair (4) |
| FC-12 | 648 | 2.63 | 144 | 0.94 |
| n-butane | 6110 | 24.8 | 248 | 1.58 |
| i-butane | 1230 | 5.0 | 49.4 | 0.31 |
| i-pentane | 13400 | 54.5 | 1520 | 9.68 |

Notes:
(1) Polyethylene used in this test had 2.3 melt index and 0.92 g/cc density.
(2) The film was aged in a 180° F. oven for one hour.
(3) Permeability in cc mil/100 in$^2$ day atm.
(4) Relative-to-air permeability.

A granular polyethylene having a 2.3 melt index and a 0.923 g/cm$^3$ density was mixed with a small amount (0.7–1.5 pph) of talcum powder by the use of a small amount of a wetting agent. Except for the control formulation (Table II, Test. No. 1), a 25% concentrate of Kemamide (trademark) S-180 stearyl stearamide made by Humko Chemical Division of Witco Chemical Corp. was also blended in the polymer in an amount sufficient to make its level in the final polymer composition 1.5 pph. The mixture was flood fed into the extruder at an essentially uniform rate of approximately 10 pounds per hour (4.5 kg per hour). The screw rotating speed was maintained at about 45 rpm throughout the tests. A blowing agent selected from a group consisting of isobutane and its mixtures with dichlorodifluoromethane (FC-12) was injected into the extruder at a predetermined rate. The temperatures of the extruder zones were set at about 115° C. at feeding zone, 130° and 150° C. at the melting and metering zones, and 165° C. at the mixing zone. The temperature of the cooling zone was adjusted so as to drop the temperature of the polymer and blowing agent mixture to a uniform foaming temperature of about 108° C. The gap of the die opening was adjusted to achieve a good quality foam without prefoaming. The threshold die gaps ranged from 0.185 to 0.220 inches (0.47 to 0.56 cm). The foam body with an approximately rectangular shape with rounded corners was conducted away from the die opening. The thicknesses and widths ranged from 0.65 to 0.83 inches (1.65 to 2.11 cm) and from 1.1 to 1.2 inches (2.8 to 3.0 cm) respectively. Foam specimens of approximately 4 to 5 inches (10 to 12.7 cm) in length were cut from the strand and subjected to dimensional stability tests both at ambient and at an elevated temperature.

All blowing agents employed in this example produced good quality foams having low density and substantially closed cell structure. Cell sizes ranged from 0.8 to 0.9 mm. As Table II shows, dimensional stability of all foams containing stearyl stearamide is excellent at ambient temperature and satisfactory at 165° F. Dimensional stability of the foam containing no permeability modifier (Test No. 1) is unsatisfactory. The results indicate that a dimensionally stable foam can be produced from stearyl stearamide-modified polyethylene by using isobutane or its mixtures with dichlorodifluoromethane (FC-12) as the blowing agent.

TABLE II

| Test No. (1) | Blowing Agent Type | Ratio (2) | Level (3) | Kemamide S-180 Level (4) | Foam Density (5) | Room Temperature Foam Stability | | | | | Foam Stability at 165° F. (9) |
|---|---|---|---|---|---|---|---|---|---|---|---|
| | | | | | | Minimum Time (6) | Minimum (7) | 1 wk (8) | 2 wk (8) | 4 wk (8) | |
| 1 | i-butane | — | 9.18 | — | 35.1 | 1 | 51 | 63 | 69 | 81 | 50 |

TABLE II-continued

| Test No. (1) | Blowing Agent Type (1) | Ratio (2) | Level (3) | Kemamide S-180 Level (4) | Foam Density (5) | Room Temperature Foam Stability Minimum Time (6) | Minimum (7) | 1 wk (8) | 2 wk (8) | 4 wk (8) | Foam Stability at 165° F. (9) |
|---|---|---|---|---|---|---|---|---|---|---|---|
| 2 | i-butane | — | 9.18 | 1.5 | 37.3 | 3 | 93 | 96 | 96 | 97 | 86 |
| 3 | FC-12/ i-butane | 60/40 | 13.9 | 1.5 | 44.4 | 3 | 97 | 98 | 98 | 98 | 99 |
| 4 | FC-12/ i-butane | 70/30 | 15.2 | 1.5 | 42.0 | 3 | 97 | 97 | 97 | 98 | 85 |

Notes:
(1) FC-12: dichlorodifluoromethane
(2) Weight ratio of two blowing agents
(3) Parts of blowing agent mixed in per hundred parts of polymer
(4) Parts of Kemamide S-180 stearyl stearamide made by Humko Chemical Division of Witco Chemical Corp. mixed in per hundred parts of polymer
(5) Density of foam body in kilograms per cubic meter measured within about five minutes after extrusion
(6) Approximate time in days to reach minimum volume expressed as percentage of initial volume
(7) Minimum volume of foam body during aging at ambient temperature as percentage of initial volume which initial volume is measured within about five minutes after extrusion
(8) Volume of foam body as percentage of initial volume after aging at ambient temperature for the specified period
(9) Minimum volume of foam body as percentage of initial volume during aging at 165° F.

EXAMPLE 3

The apparatus used in this example is a 1 inch (2.54 cm) screw type extruder having essentially the same configuration as the one used in Example 2. Its operating procedure is essentially the same. The width of the gap-adjusted die orifice attached to this foaming extruder is 0.15 inches (0.38 cm).

The same polyethylene used in Example 2 was mixed with 0.7 pph talc and Kemamide S-180 concentrate. The level of Kemamide S-180 stearyl stearamide was kept the same at 1.5 pph for all tests in this example. The solid mixture was fed into the extruder at a uniform rate of five pounds per hour (2.27 kg/hr) by the use of a calibrated weight feeder. Isobutane or its mixture with dichlorodifluoromethane (FC-12) was used as the blowing agent. Temperatures of the extruder zones were set at about 130° C. at the feeding zone, 160° and 190° C. at the melting and metering zones and 180° C. at the mixing zone. The temperature of the cooling zone was adjusted in order to cool the gel down to a uniform temperature of about 111° C. At a die opening close to the threshold to prefoaming, foam samples were taken. The threshold die gaps ranged from 0.065 to 0.080 inches (0.16 to 0.20 cm). The thicknesses and widths of foam cross-sections ranged from 0.46 to 0.57 inches (1.17 to 1.44 cm) and 0.58 to 0.65 inches (1.47 to 1.65 cm), respectively. Foam specimens of approximately 4 inches (10 cm) in length were cut from the strand and subjected to dimensional stability tests.

Isobutane and its mixtures with dichlorodifluoromethane (FC-12) for a wide range of mixture ratios repeated their performance in the tests of this example. Excellent quality foams having low density, low open cell content, and fine uniform cell size were produced. Cell sizes range from 0.8 to 1.6 mm. As shown in Table III, all blowing agents provide foams having good stability at ambient temperature and satisfactory stability at 105° F. which simulates a summer condition.

EXAMPLE 4

In the tests of this example, the same apparatus was used and the same solid composition and operating procedure as in Example 2. Mixtures of 1,2-dichlorotetrafluoroethane (FC-114) with isobutane were employed as the blowing agents. At Table IV shows, the blowing agents produce high quality foams having excellent dimensional stability both at ambient and high temperatures.

TABLE III

| Test No. (1) | Blowing Agent Type (1) | Ratio (2) | Level (3) | Foam Density (5) | Room Temperature Foam Stability Minimum Time (6) | Minimum (7) | 1 wk (8) | 4 wk (8) | 3 mo (8) | Foam Stability at 105° F. (9) |
|---|---|---|---|---|---|---|---|---|---|---|
| 1 | i-butane | — | 7.9 | 42.6 | 6 | 95 | 95 | 95 | 95 | 95 |
| 2 | FC-12/ i-butane | 20/80 | 8.2 | 39.6 | 6 | 94 | 94 | 95 | 95 | 95 |
| 3 | FC-12/ i-butane | 50/50 | 10.2 | 32.8 | 3 | 94 | 94 | 95 | 95 | 84 |
| 4 | FC-12/ i-butane | 70/30 | 13.0 | 30.4 | 1 | 86 | 98 | 98 | 98 | 85 |
| 5 | FC-12/ i-butane | 80/20 | 17.8 | 31.9 | 1 | 90 | 97 | 97 | 98 | 81 |
| 6 | FC-12/ | 90/10 | 15.6 | 33.2 | 1 | 85 | 97 | 98 | 98 | 85 |

TABLE III-continued

| Test No. | Blowing Agent Type (1) | Blowing Agent Ratio (2) | Blowing Agent Level (3) | Foam Density (5) | Room Temperature Foam Stability Minimum Time (6) | Minimum (7) | 1 wk (8) | 4 wk (8) | 3 mo (8) | Foam Stability at 105° F. (9) |
|---|---|---|---|---|---|---|---|---|---|---|
| | i-butane | | | | | | | | | |

Notes:
All formulations contained 1.5 pph Kemamide S-180 Stearyl Stearamide
(1) FC-12: dichlorodifluoromethane
(2) Weight ratio of two blowing agents
(3) Parts of blowing agent mixed in per hundred parts of polymer
(5) Density of foam body in kilograms per cubic meter measured within about five minutes after extrusion
(6) Approximate time in days to reach minimum volume expressed as percentage of initial volume
(7) Minimum volume of foam body during aging at ambient temperature as percentage of initial volume which initial volume is measured within about five minutes after extrusion
(8) Volume of foam body as percentage of initial volume after aging at ambient temperature for the specified period (9) minimum volume of foam body as percentage of initial volume during aging at 105° F.
(9) Minimum volume of foam body as percentage of initial volume during aging at 105° F.

TABLE IV

| Test No. | Blowing Agent Type (1) | Blowing Agent Ratio (2) | Blowing Agent Level (3) | Foam Density (5) | Room Temperature Foam Stability Minimum Time (6) | Minimum (7) | 1 wk (8) | 4 wk (8) | 3 mo (8) | Foam Stability at 105° F. (9) |
|---|---|---|---|---|---|---|---|---|---|---|
| 1 | FC-114/ i-butane | 70/30 | 17.2 | 36.5 | 28 | 98 | 99 | 98 | 98 | 97 |
| 2 | FC-114/ i-butane | 80/20 | 20.5 | 34.1 | 1 | 97 | 99 | 98 | 97 | 96 |
| 3 | FC-114/ i-butane | 90/10 | 21.5 | 38.3 | 7 | 98 | 98 | 99 | 98 | 97 |

Notes:
All formulations contained 1.5 pph Kemamide S-180 Stearyl Stearamide
(1) FC-114: 1,2-dichlorotetrafluoroethane
(2) Weight ratio of two blowing agents
(3) Parts of blowing agent mixed in per hundred parts of polymer
(5) Density of foam body in kilograms per cubic meter measured within about five minutes after extrusion
(6) Approximate time in days to reach minimum volume expressed as percentage of initial volume
(7) Minimum volume of foam body during aging at ambient temperature as percentage of initial volume which initial volume is measured within about five minutes after extrusion
(8) Volume of foam body as percentage of initial volume after aging at ambient temperature for the specified period
(9) Minimum volume of foam body as percentage of initial volume during aging at 105° F.

Having described the invention in detail and by reference to preferred embodiments thereof, it wll be apparent that modifications and variations are possible without departing from the scope of the invention defined in the appended claims.

What is claimed is:

1. An expanded polyolefin foam comprising an olefin polymer resin selected from the group consisting of ethylene homopolymers and copolymers of ethylene and a copolymerizable monomer, a stability control agent selected from the group consisting of partial esters of long chain fatty acids with polyols, higher alkyl amines, fatty acid amides, and olefinically unsaturated carboxylic acid copolymers, and a blowing agent selected from the group consisting of (i) isobutane, (ii) a mixture of from 5%-95% isobutane on a molar basis with from 95%-5% of a physical blowing agent selected from the group consisting of chlorofluorocarbons and fluorocarbons having from 1 to 4 carbon atoms, boiling points between −50° and 50° C., and a permeation rate through said olefin polymer resin modified with said stability control agent of less than about 1.2 times the permeation rate of air, and (iii) a mixture of at least 70% isobutane with a physical blowing agent selected from the group consisting of hydrocarbons, chlorocarbons, and chlorofluorocarbons having from 1 to 5 carbon atoms, boiling points between −50° C. and 50° C., and a permeation rate through said olefin polymer resin modified with said stability control agent of greater than about 1.2 times the permeation rate of air.

2. The foam of claim 1 in which said copolymerizable monomer is vinyl acetate.

3. The foam of claim 1 in which said olefin polymer resin is low density polyethylene.

4. The foam of claim 1 in which said stability control agent is a fatty acid amide.

* * * * *

REEXAMINATION CERTIFICATE (2987th)

United States Patent [19]

Park

[11] B1 4,640,933

[45] Certificate Issued Sep. 10, 1996

[54] EXPANDABLE POLYOLEFIN COMPOSITIONS AND PREPARATION PROCESS UTILIZING ISOBUTANE BLOWING AGENT

[75] Inventor: Chung P. Park, Pickerington, Ohio

[73] Assignee: The Dow Chemical Company, Midland, Mich.

Reexamination Requests:
No. 90/003,340, Feb. 18, 1994
No. 90/003,530, Aug. 15, 1994

Reexamination Certificate for:
Patent No.: 4,640,933
Issued: Feb. 3, 1987
Appl. No.: 868,395
Filed: May 27, 1986

Related U.S. Application Data

[62] Division of Ser. No. 843,422, Mar. 24, 1986, which is a division of Ser. No. 813,315, Dec. 24, 1985.

[51] Int. Cl.$^6$ ............................................. C08J 9/14
[52] U.S. Cl. .................... 521/94; 264/53; 264/DIG. 5; 521/79; 521/81; 521/97; 521/134; 521/139; 521/98; 521/910
[58] Field of Search ............................. 521/94, 79, 81, 521/97, 98, 134, 139, 910; 264/53

[56] References Cited

U.S. PATENT DOCUMENTS

| | | | |
|---|---|---|---|
| 3,062,729 | 11/1962 | Skochdopole et al. | 204/154 |
| 3,067,147 | 12/1962 | Rubens et al. | |
| 3,102,865 | 9/1968 | Sneary | 260/2.5 |
| 3,379,802 | 4/1968 | Raley et al. | 266/54 |
| 3,632,532 | 1/1972 | Gaeth et al. | 260/2.5 |
| 3,644,230 | 2/1972 | Cronin | 260/2.5 E |
| 3,755,208 | 8/1973 | Ehrenfreund | 260/2.5 E |
| 3,808,300 | 4/1974 | Miyamoto et al. | 264/53 |
| 3,856,717 | 12/1974 | Theard et al. | 260/2.5 HA |
| 4,214,054 | 7/1980 | Watanabe et al. | 521/95 |
| 4,217,319 | 8/1980 | Komori | 264/53 |
| 4,395,551 | 7/1983 | Park | 524/230 |

FOREIGN PATENT DOCUMENTS

| | | |
|---|---|---|
| 844663 | 6/1970 | Canada. |
| 52-32972 | 3/1977 | Japan. |
| 1170802 | 11/1969 | United Kingdom. |
| 1192333 | 5/1970 | United Kingdom. |

OTHER PUBLICATIONS

Benning, Calvin J., Plastic Foams, vol., 1, Wiley–Interscience, (1969), preface and pp. 38 to 47.

Benning, Calvin J., Plastic Foams, vol. 2, Wiley–Interscience, (1969), preface and pp. 293 to 297.

*Primary Examiner*—Morton Foelak

[57] ABSTRACT

An expandable polyolefin composition and a method of preparation are provided. Isobutane or mixtures of isobutane with other physical blowing agents are utilized to expand polyolefin compositions which have been modified by the addition of a stability control agent. The composition has a high degree of dimensional stability and exhibits minimal shrinkage during curing and/or aging.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 3 is confirmed.

Claims 1, 2 and 4 are cancelled.

New claims 5–14 are added and determined to be patentable.

5. *The foam of claim 3, wherein the olefin polymer resin consists essentially of low density polyethylene.*

6. *The foam of claim 3, wherein the stability control agent is partial esters of long chain fatty acid esters with polyols.*

7. *The foam of claim 6, wherein the stability control agent comprises fatty acid amides.*

8. *The foam of claim 3, wherein the blowing agent is a mixture of from 5%–95% isobutane on a molar basis with from 95%–5% of a physical blowing agent selected from the group consisting of chlorofluorocarbons and fluorocarbons having from 1 to 4 carbon atoms, boiling points between −50° and 50° C., and a permeation rate through said olefin polymer resin modified with said stability control agent of less than about 1.2 times the permeation rate of air.*

9. *The foam of claim 3, wherein the blowing agent is a mixture of at least 70% isobutane with a physical blowing agent selected from the group consisting of hydrocarbons, chlorocarbons, and chlorofluorocarbons having from 1 to 5 carbon atoms, boiling points between −50° C. and 50° C., and a permeation rate through said olefin polymer resin modified with said stability control agent of greater than about 1.2 times the permeation rate of air.*

10. *The foam of claim 3, wherein the blowing agent is isobutane.*

11. *The foam of claim 3, wherein the foam has dimensional stability and is substantially closed cell.*

12. *The foam of claim 3, wherein the olefin polymer resin consists essentially of low density polyethylene, the stability control agent being partial esters of long chain fatty acids with polyols, the foam having dimensional stability and being substantially closed cell.*

13. *The foam of claim 9, wherein the olefin polymer resin consists essentially of low density polyethylene, the stability control agent being partial esters of long chain fatty acids with polyols, the foam having dimensional stability and being substantially closed cell.*

14. *The foam of claim 10, wherein the olefin polymer resin consists essentially of low density polyethylene, the stability control agent being partial esters of long chain fatty acids with polyols, the foam having dimensional stability and being substantially closed cell.*

* * * * *